Patented July 7, 1942

2,288,875

UNITED STATES PATENT OFFICE 2,288,875

CATALYTIC HYDROCARBON OIL CONVERSION

Edmond L. d'Ouville, Chicago, Ill., assignor to Standard Oil Company, Chicago, Ill., a corporation of Indiana No Drawing. Application December 30, 1939, Serial No. 311,949

19 Claims. (Cl. 196—52)

This invention relates to the conversion of hydrocarbons with catalysts and also to the manufacture of a catalyst suitable for the conversion of hydrocarbons at elevated temperature. It further relates to catalysts for hydrocarbon conversion. The conversion of hydrocarbons includes the cracking of hydrocarbon oils, especially in the vapor phase, to produce gasoline motor fuel; the viscosity breaking of heavy oils; the reforming of gasoline and naphthas, more particularly heavy naphthas boiling in the upper gasoline boiling range and somewhat above; dehydrogenation of naphthas, especially light naphthas boiling in the range of hexane and octane; gas reversion or the simultaneous conversion and combination of fixed hydrocarbon gases and hydrocarbon oils, and similar operations wherein hydrocarbons are subjected to the action of a catalyst at elevated conversion temperatures whereby the carbon skeleton of the hydrocarbons is disrupted or rearranged. The temperatures employed are generally in the range of about 700 to about 1100° F., depending on the particular type of operation to which the catalyst is applied. Cracking of heavy oils, such as gas oil, is usually effected with the catalyst at temperatures of about 850 to 975° F., whereas naphtha reforming may be carried out at temperatures within the range of about 950 to 1050° F.

A primary object of the invention is to produce a hydrocarbon conversion catalyst of high efficiency from blast furnace slag. Another object of the invention is to produce hydrocarbon conversion catalysts having a higher resistance to elevated temperatures occurring during regeneration than is obtainable with catalysts heretofore produced by activating natural products. Still another object of my invention is to effect the cracking of gas oils into gasoline with a minimum production of by-product gas and carbon by contacting the vapors of the gas oil, while under controlled temperature conditions, with a catalyst obtained from blast furnace slag. Still another object of my invention is to provide a method of treating blast furnace slag whereby it is converted from a substantially inactive substance into a highly active catalyst for the conversion of hydrocarbon oils. Other objects of the invention will become apparent from the following description thereof.

In carrying out my invention, I prepare my hydrocarbon conversion catalyst by the treatment of blast furnace slag with acids, generally mineral acids, in a particular manner. The slag which I employ as the raw material is preferably that obtained from the smelting of hematite ores in conventional steel mill practice. The molten slag from the blast furnace is preferably disintegrated by discharging it into a stream of water and the resulting slag "sand" is then ground to a fine state of subdivision before the acid treatment just referred to.

The slag which I employ is usually comprised principally of silica, alumina, magnesia and lime, together with a small amount of other materials, including iron, manganese, sulphur and phosphorus, with a trace of potash and soda. Various other elements may be present in small proportions, generally up to 1 or 2%, depending upon the character of ore employed in the smelting operation. A general analysis of blast furnace slag showing the proportions of the principal ingredients follows:

|  | Per cent |
|---|---|
| Silica | 25–40 |
| Alumina | 10–15 |
| Magnesia | 5–25 |
| Lime | 20–50 |

The silica and alumina contents may vary from these figures and silica may reach 55% in some cases. Alumina may be as low at 5% or less and yet give a slag suitable for my process.

In carrying out my process of making hydrocarbon conversion catalysts from blast furnace slag, I prefer to grind or otherwise reduce the slag to a fine powder in order that it may be more readily attacked by the acid used in the disintegration step of the process. Thus, I may reduce the slag to about 100 mesh and in some cases even to 150 or 300 mesh. I may also use "slag wool" which is a fibrous form of slag. If no larger particles are present, complete solution in acid will take place in a short time. If large particles are present they may not be completely disintegrated or dissolved and will remain in the finished catalyst product or, if desired, they may be separated in a separate step as hereinafter described. Foreign matter such as carbon and dirt will also remain undissolved. The powdered slag is then treated with a solution of a strong acid, such as hydrochloric, sulfuric, sulfamic, oxalic, phosphoric or nitric acid.

In a typical example, I may treat the slag with hydrochloric acid at a concentration of 15 to 20% HCl, adding one part of slag to about five parts by weight of the acid solution. A water slurry of the slag may be added to the acid to obtain rapid and uniform contact. The treatment may be conducted at ordinary temperature, which usually requires cooling to remove the heat of reaction. In general, however, I find it desirable to carry out the treatment at somewhat elevated temperature, for example, 80 to 150° C., but preferably at the boiling point of the acid, about 110° C., in the case of 17% HCl. Thus, whereas the treatment may require several hours or days at ordinary temperature, disintegration of the slag may be complete within 5 minutes to an hour at the elevated temperature attained by allowing the reaction to proceed normally without cooling. Boiling also serves to drive off $H_2S$, thus diminishing the sulfur in the catalyst.

By controlling the concentration and the quantity of the acid used the strength of the catalyst may be improved. In a typical example, 100 grams of powdered blast furnace slag were disintegrated with a solution of 250 ml. 35% hydrochloric acid dissolved in 1700 ml. of water. The yield of catalyst after coagulation, washing and drying was 40 grams. If much less acid is used the slag will not be completely disintegrated. Also, if less water is used the catalyst obtained will have a lower density and will generally be physically weaker. The use of more water increases the cost of evaporation and drying, and the concentration may be increased, for example, to 100 grams of slag for 800 ml. of water, but in that case, it is desirable to let the gelled catalyst age for several hours to several days. When sulfuric acid is used, I have found that 100 grams of concentrated sulfuric acid diluted to approximately 2 liters is sufficient to disintegrate 100 grams of powdered slag. This ratio of acid to slag will need to be varied somewhat, due to differences in the compositions of different slags, and in general the amount of acid necessary must be increased in proportion to the lime content of the slag. When phosphoric acid is used in the proportion of about 200 grams of acid or more to 100 grams of slag, precipitation of calcium phosphate may be largely avoided.

Where the slag is sufficiently finely ground, and the proper concentration and amount of acid is used, it will pass completely into solution in the acid giving a colloidal silica sol together with salts of other elements present, such as calcium, magnesium, aluminum, iron, manganese, etc. Thus, in the treatment of blast furnace slag with hydrochloric acid, calcium and aluminum chlorides are present with the silica sol. In the case where, because of insufficient grinding or non-uniformity, some of the slag remains undissolved in the acid, it may be separated from the solution by filtration or decantation. To facilitate this separation, the solution may be stabilized in various ways, as by strong cooling, adding alcohol or other stabilizers. In either case, the solution is allowed to coagulate in the form of a gel. Coagulation may be accelerated by heating, boiling, evaporating, or by adding coagulants, such as phosphoric acid or neutralizing agents, such as ammonium hydroxide, calcium hydroxide, sodium acetate, sodium silicate, etc. to adjust the hydrogen ion concentration. By carefully controlling the hydrogen ion concentration during gelation, a stronger catalyst is obtained.

Where a neutralizing agent is used, it is generally desirable to add an amount only sufficient to reduce the acidity without completely neutralizing the acid. Thus, the acidity of the disintegrated slag solution may be reduced to a pH of about 1 to 5. When sodium silicate is employed as the neutralizing agent, silica is produced and combines with the catalytic substance from the slag. In some cases, it is desirable to carry the neutralization beyond a pH of 5 and thereby precipitate a portion of the basic elements. Thus, sufficient ammonia may be added to cause the precipitation of some aluminum hydroxide and thus increase the amount of alumina in the coagulated catalyst.

After coagulation, the gelatinous mass is broken up and washed with a copious quantity of water to remove excess acid and soluble salts, or the washing step may be deferred until after initially drying or partially drying. After washing, the mass is dried and crushed to the desired size or pelleted or extruded for use in the hydrocarbon conversion system. The catalyst may also be powdered and contacted with oil vapors in suspension. After use, the catalyst becomes deactivated, chiefly by carbon deposition, and it may be reactivated by burning with air or a mixture of air and inert gas, care being taken to prevent too high temperatures occurring. Generally the temperature should be kept below about 1100° F. although in some cases, temperatures to 1400° F. may be tolerated without serious damage to catalyst activity.

As indicated herein above, I may use various acids for decomposing the blast furnace slag. When sulfuric acid or phosphoric acid is employed, for example, 10 to 25% concentration of sulfuric acid, a major portion of the calcium contained in the slag is converted into the insoluble sulfate or phosphate. I have found by actual tests in the conversion of hydrocarbon oils that the presence of calcium sulfate in the catalyst may confer certain valuable properties. Thus, I have found that in some cases the calcium sulfate increases the physical strength of the catalyst and also may increase the catalyst life by inhibiting the deposition of carbon. The amount of calcium sulfate in the catalyst may be controlled by regulating the amount of $H_2SO_4$ used in disintegration of the slag, completing the disintegration with HCl or other acid.

If it is desired, however, to eliminate the calcium sulfate from the catalyst, this may be readily accomplished by filtering or decanting the disintegrated solution obtained from the disintegration of the blast furnace slag before gelation has occurred. The time required for gelation depends on a variety of conditions and will ordinarily be between one hour and one day. Gelation, however, may be inhibited or slowed down in several ways, for example, by adding alcohol for example, about 5 to 10%, or by cooling the solution, thereby facilitating the separation of calcium sulfate and/or other insoluble substances.

My catalyst appears to consist substantially of an extremely active form of silica suitable for hydrocarbon conversion, promoted by various substances derived from the slag. If the gelled slag is washed with hot water, the amount of promoter left in the catalyst may be increased, probably because of increased hydrolysis of the salts present. When the acid used in disintegration is a volatile acid, such as HCl or $HNO_3$, the amount of promoter in the catalyst may be increased by drying at a slightly elevated temperature before washing the coagulated catalyst. Drying at 250 to 400° F. is sufficient to drive off the excess acid. Final washing with water then effects a greater hydrolysis of the salts with retention of more promoter by the catalyst.

The silica content of my catalyst is generally high, usually about 80% or 90% or more, except in the case where calcium sulfate, barium sulfate or other insoluble salt is present, in which case, the silica content may be as low as 50% or less, as previously indicated. Other catalytically activating elements may be added to the catalyst by adding their salts or oxides to the slag either before or after disintegration. Thus, chromium, molybdenum, vanadium, manganese, cobalt, nickel, copper or thorium oxide may be added to the slag in amounts of .05 to 3%, more or less. If oxides, hydroxides or other insoluble compound of the activating element is employed, it should be thoroughly mixed by grinding.

I may also modify my catalyst material by applying to it other catalytic metals after the material has been coagulated and washed, either before or after drying. Thus, I may apply to the coagulated and washed catalyst solutions of certain activating metals as ammonium molybdate, chromic acid, nickel nitrate, etc. The resulting product is then dried and heated to an elevated temperature to decompose the activating metal compounds. I may also intimately mix my catalyst with oxides, hydroxides, etc. of activating metals, such as aluminum, titanium, magnesium, chromium, etc.

The following examples illustrate the conversion of hydrocarbon oil with my slag catalyst. The conditions given are typical but may be varied widely. Thus the space velocity may be varied from 0.1 to 10, generally depending on pressure and temperature. The higher the temperature, the lower the space velocity which may be employed.

Example I

A Mid-Continent gas oil of 35° A. P. I. was vaporized and treated with a catalyst at a temperature of 925° F. and space velocity of 1. Space velocity is the volume of oil passed through 1 volume of catalyst (apparent) in 1 hour. The following data are the results of runs of 5 hours' duration. The catalyst used in the first four runs was obtained from blast furnace slag treated with HCl. The catalyst employed in run 5 was prepared from blast furnace slag by treatment with sulfuric acid and contained calcium sulfate.

| | Run No. — | | | | |
|---|---|---|---|---|---|
| | 1 | 2 | 3 | 4 | 5 |
| Catalyst | Gran. fresh | Gran. regen. | Pell. fresh | Pell. regen. | Fresh CaSO₄. |
| Apparent density of catalyst | 0.61 | 0.61 | 0.55 | 0.55 | 0.51. |
| Gasoline vol. per cent | 21.0 | 22.90 | 22.07 | 23.27 | 17.92. |
| Gas, wt. per cent | 4.58 | 5.06 | 7.93 | 7.05 | 4.89. |
| Lbs. gas/gal. gasoline | 1.54 | 1.57 | 2.54 | 2.14 | 1.93. |
| Carbon—per cent of oil charged | | 0.81 | 1.22 | 0.87 | 0.30. |
| Knock rating of gasoline—C. F. R. M. | 80.2 | 80.2 | | 81.8 | |

The knock ratings reported are octane numbers determined on the whole product by the Cooperative Fuel Research Motor Method, and do not represent the blending value which is considerably higher. It will be noted that the gasoline yield in run 5 was lower, perhaps because of the calcium sulfate which forms a considerable part of the catalyst. However, it will also be noted that the carbon formation in run 5 is also considerably lower, showing the carbon inhibiting effect of the calcium sulfate.

Example II

Mid-Continent gas oil was cracked at 925° F. for a period of five hours in the presence of a catalyst prepared from blast furnace slag by the action of sulfuric acid. The catalyst contained between 26 and 34% of calcium sulfate. The following data show the results obtained:

| | |
|---|---|
| Space velocity | 1.22 |
| Gasoline vol. per cent | 18.1 |
| Gas wt. per cent | 4.4 |
| Lbs. gas/gal. gasoline | 1.7 |
| Specific gravity of gas (air=1) | 0.68 |
| Carbon, per cent of oil charged | 0.42 |

Example III

Mid-Continent gas oil of 35° A.P.I. was cracked at 925° F. in the presence of catalysts prepared from blast furnace slag. The following data show the results obtained:

| | Run No. — | |
|---|---|---|
| | 1 | 2 |
| Catalyst | Contained about 10% CaSO₄. | Same as No. 1 regenerated. |
| Space velocity | 0.62 | 0.99. |
| Run time, hours | 4.0 | 5.0. |
| Gasoline, volume percent | 32.45 | 25.64. |
| Gas, weight percent | 8.26 | 5.43. |
| Specific gravity of gas (air=1) | 0.74 | 0.79. |
| Knock rating | 80.4 | 80.6 |
| Carbon, percent of oil charged | | 0.58. |

Example IV

This example shows the results obtained by repeatedly using the catalyst containing calcium sulfate without intermediate regeneration. The catalyst employed contained 38% of CaSO₄. After a total operating time of 20.75 hours, the carbon deposit on the catalyst was not appreciable, the catalyst being only dark gray instead of completely black. The hydrocarbon was Mid-Continent gas oil of 35° A. P. I. employed at a temperature of 925° F.

| | Run No.— | | | | |
|---|---|---|---|---|---|
| | 1 | 2 | 3 | 4 | Overall |
| Run time, hours | 2.75 | 6.00 | 6.00 | 6.00 | 20.75 |
| Space velocity | 1.32 | 1.16 | 1.21 | 0.99 | 1.15 |
| Gasoline, volume percent | 22.3 | 16.74 | 11.37 | 11.90 | 14.75 |
| Gas, weight percent | 4.85 | 3.18 | 2.47 | 3.07 | 3.18 |
| Lbs. gas/gal. gasoline | 1.54 | 1.34 | 1.54 | 1.80 | |

Example V

This example shows the results obtained with a catalyst made by treating blast furnace slag with HCl and neutralizing the excess acid with sodium silicate solution. Mid-Continent gas oil of 35° A. P. I. was cracked at 925° F.

|  | Run No.— | | |
| --- | --- | --- | --- |
|  | 1 | 2 | 3 |
| Catalyst | Fresh | (¹) | (²) |
| Run time, hours | 5.0 | 5.0 | 5.0 |
| Space velocity | 1.00 | 0.996 | 0.63 |
| Gasoline, volume percent | 20.3 | 20.9 | 28.1 |
| Gas, weight percent | 5.3 | 6.0 | 7.31 |
| Lbs. gas/gal. gasoline | 1.86 | 2.03 | 1.84 |
| Specific gravity of gas (air=1) | 0.83 | 0.99 | 1.00 |
| Weight balance | 99.0 | 99.8 | 100.2 |
| Carbon, percent of oil charged |  |  | 0.38 |

¹ Regenerated from run No. 1.
² Regenerated.

Example VI

The following results were obtained by the treatment of a cracked naphtha with a catalyst prepared from blast furnace slag with hydrochloric acid disintegration. The naphtha treated was obtained from the cracking of a petroleum residue and had an octane number of 58.6 C. F. R. Motor Method. The end point was 394° F. It was treated at 800° F. at the rate of 11.7 volume (liquid) per volume of catalyst per hour. The yield obtained was approximately 99.9% of naphtha and about 0.1% of carbon with negligible amounts of fixed gases. The yield based on the catalyst was 980 barrels per ton. The resulting gasoline possessed the following characteristics:

Knock rating C. F. R. M_____ 64.5
End point, A. S. T. M_____°F.___ 428
Sulfur content_____%___ 0.13

Having thus described my invention, what I claim is:

1. The process of converting hydrocarbon oils which comprises contacting said oils at conversion temperature with a catalyst prepared by the gelation of blast furnace slag with an acid wherein said slag is partially dissolved in said acid, washing, drying and igniting the resulting gel.

2. The process of claim 1 wherein the said catalyst is derived from blast furnace slag by treating with a mineral acid selected from the class consisting of hydrochloric acid, sulfuric acid, phosphoric acid and nitric acid.

3. The process of claim 1 wherein the conversion temperature employed is about 700 to 1100° F.

4. The process of converting heavy hydrocarbon oils into gasoline which comprises vaporizing the oils and passing the vapors at a high conversion temperature within the range of 700 to 1100° F. into contact with a catalyst derived from treatment of blast furnace slag with sulfuric acid until the slag is substantially disintegrated and dissolved by the action of the acid after which the resulting disintegration product is coagulated, washed and dried.

5. The process of claim 4 wherein calcium sulfate is separated from the solution of disintegrated slag before coagulation thereof.

6. The process of converting heavy hydrocarbon oils into high knock rating gasoline wherein the vapors of said oils are contacted at conversion temperatures with a solid conversion catalyst comprising a decomposition product of blast furnace slag produced by disintegrating and dissolving said slag with a mineral acid, coagulating, washing and drying the resulting disintegration product.

7. The process of claim 6 wherein catalytically activating metals are added to said disintegrated slag.

8. The process of converting heavy hydrocarbon oils into high knock rating gasoline which comprises contacting said oils at conversion temperature with a solid hydrocarbon conversion catalyst prepared by treating blast furnace slag with a mineral acid, whereby said slag is substantially disintegrated and dissolved, coagulating the resulting slag solution under conditions of controlled hydrogen ion concentration, washing and drying the coagulated product and incorporating in said product metals promoting said hydrocarbon conversion before contacting hydrocarbon oils therewith.

9. In the method of claim 8, separating the slag solution from insoluble materials before coagulation.

10. In the method of claim 8, stabilizing said slag solution to delay coagulation and separating insoluble products from said solution before said coagulation step.

11. In the method of claim 8, employing about 800 to 2000 ml. of acid for each 100 grams of slag treated.

12. The method of making a hydrocarbon conversion catalyst adapted to the conversion of heavy hydrocarbon oils into gasoline at conversion temperatures in the range of about 700 to 1100° F., comprising subjecting finely divided blast furnace slag to the action of an acid until said slag is substantially dissolved, regulating the hydrogen ion concentration of said solution within the range of about 1 to 5 pH, allowing the solution to coagulate, washing the coagulated product with water until substantially free from soluble ingredients and then drying the product.

13. The method of claim 12 wherein hot water is employed to remove soluble ingredients in said washing step.

14. The method of claim 12 wherein said catalyst is activated by adding thereto a compound of a metal selected from the class consisting of calcium, magnesium, aluminum, iron, manganese, chromium, molybdenum, vanadium, cobalt, nickel, copper and thorium while said catalyst is in the process of preparation.

15. The process of converting heavy hydrocarbon oils which comprises contacting the vapors of said oils at a conversion temperature with a catalyst prepared by disintegrating and dissolving blast furnace slag with sulfuric acid, whereby calcium compounds contained in said slag are converted to insoluble calcium sulfate, coagulating said disintegrated slag in the presence of said calcium sulfate and washing and drying to remove water soluble ingredients and water.

16. The process of converting hydrocarbon oils which comprises contacting the vapors of said oils at a conversion temperature with a catalyst prepared by disintegrating blast furnace slag with an excess of acid beyond that required to neutralize the basic constituents of said slag, adding a neutralizing agent to the mixture of said acid and disintegrated slag, whereby the hydrogen ion concentration of said mixture is reduced, and thereafter coagulating said disintegrated slag to produce the desired catalyst.

17. The process of claim 16 wherein the said neutralizing agent is sodium silicate.

18. The process of claim 16 wherein said neutralizing agent is employed in an amount sufficient to precipitate a portion of the alumina initially present in said slag.

19. The method of making a hydrocarbon conversion catalyst adapted to the conversion of hydrocarbon oils into high knock rating gasoline at temperatures in the range of about 700 to 1100° F. comprising subjecting finely divided blast furnace slag to the action of a water solution of a volatile mineral acid until said slag is substantially dissolved, regulating the hydrogen ion concentration of said solution within the range of about 1 to 5 pH, allowing the solution to coagulate, drying the resulting catalyst at a slightly elevated temperature and finally washing the dried catalyst with water until it is substantially free from soluble ingredients.

EDMOND L. D'OUVILLE.